3,365,449
7-(SUBSTITUTED THIOACYLAMINO) CEPH-
ALOSPORANIC ACID AND DERIVATIVES
THEREOF
Tadayoshi Takano, Hirakata, Kiyoshi Hattori, Ibaragi, Kazuo Nakanishi and Kazuko Miura, Osaka, Suminori Umio, Nishinomiya, and Teiji Kishimoto, Kyoto, Japan, assignors to Fujisawa Pharmaceutical Co., Ltd., Osaka, Japan, a company of Japan
No Drawing. Filed July 20, 1965, Ser. No. 473,515
Claims priority, application Japan, July 23, 1964, 39/42,134
10 Claims. (Cl. 260—243)

This invention relates to 7-(substituted thioacylamino) cephalosporanic acid and derivatives thereof, which compounds are useful as antimicrobial agents.

The compounds of this invention may be represented by the following general Formula I:

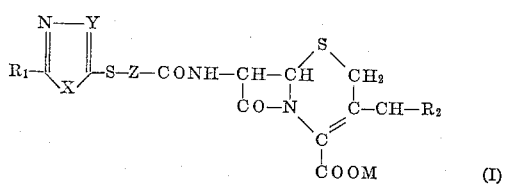

wherein $R_1$ is lower alkyl, lower alkanoylamino, pyridyl, or aryl radical which is substituted or unsubstituted with halogen or nitro radical; $R_2$ is an acetoxy or pyridinium group; X is oxygen or sulfur atom; Y is nitrogen atom or =CH—; Z is —$CH_2$— or —$CH_2$—$CH_2$—; and M is hydrogen atom, a pharmaceutically acceptable non-toxic cation or an anionic charge.

As used herein the term "lower" is intended to mean groups containing one to six carbon atoms.

In the above Formula I, when $R_1$ is aryl it includes phenyl, naphthyl, tolyl, etc. and it may be substituted with nitro or halogen atom such as chlorine, bromine, iodine, etc., and when M is a pharmaceutically acceptable non-toxic cation it includes, for example, an alkali metal ion such as the sodium or potassium ion, the ammonium ion and an organic quaternary ammonium cation such as triethylammonium, dicyclohexylammonium, diphenylenediammonium or dibenzylethylenediammonium.

The compound of Formula I of this invention may be prepared by reacting 7-aminocephalosporanic acid or a derivative thereof having the general Formula II:

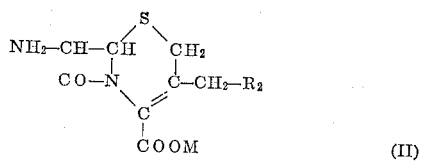

with a substituted thiocarboxylic acid having the general Formula III:

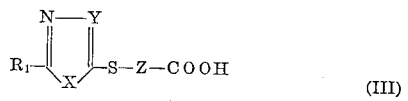

or a reactive derivative thereof, wherein $R_1$, $R_2$, X, Y, Z and M have the same as those described in Formula I.

Examples of the carboxylic acid of Formula III are in concrete, 2-acetamidothiazole-5-(2-thioacetic acid),
2-acetamidothiazole-5-(3-thiopropionic acid),
2-methyl-1,3,4-oxadiazole-5-(2-thioacetic acid),
2-methyl-1,3,4-oxadiazole-5-(3-thiopropionic acid),
2-ethyl-1,3,4-oxadiazole-5-(2-thioacetic acid),
2-ethyl-1,3,4-oxadiazole-5-(3-thiopropionic acid),
2-phenyl-1,3,4-oxadiazole-5-(2-thioacetic acid),
2-phenyl-1,3,4-oxadiazole-5-(3-thiopropionic acid),
2-(3-chlorophenyl)-1,3,4-oxadiazole-5-(2-thioacetic acid),
2-(3-chlorophenyl)-1,3,4-oxadiazole-5-(3-thiopropionic acid),
2-(4-chlorophenyl)-1,3,4-oxadiazole-5-(2-thioacetic acid),
2-(4-chlorophenyl)-1,3,4-oxadiazole-5-(3-thiopropionic acid),
2-(3,4-dichlorophenyl)-1,3,4-oxadiazole-5-(2-thioacetic acid),
2-(3,4-dichlorophenyl)-1,3,4-oxadiazole-5-(3-thiopropionic acid),
2-(3,4,5-trichlorophenyl)-1,3,4-oxadiazole-5-(2-thioacetic acid),
2-(3,4,5-trichlorophenyl)-1,3,4-oxadiazole-5-(3-thiopropionic acid),
2-(3-nitrophenyl)-1,3,4-oxadiazole-5-(2-thioacetic acid),
2-(3-nitrophenyl)-1,3,4-oxadiazole-5-(3-thiopropionic acid),
2-(4-nitrophenyl)-1,3,4-oxadiazole-5-(2-thioacetic acid),
2-(4-nitrophenyl)-1,3,4-oxadiazole-5-(3-thiopropionic acid),
2-(3-chloro-4-nitrophenyl)-1,3,4-oxadiazole-5-(2-thioacetic acid),
2-(3-chloro-4-nitrophenyl)-1,3,4-oxadiazole-5-(3-thiopropionic acid),
2-pyridinyl-1,3,4-oxadiazole-5-(2-thioacetic acid),
2-pyridinyl-1,3,4-oxadiazole-5-(3-thiopropionic acid), and further each of the above compounds replacing "thiazole" and "1,3,4-oxadiazole" with "1,3,4-thiadiazole."

7-aminocephalosporanic acid (7-amino-3-acetoxymethyl-3-cephem-4-carboxylic acid) which is one of the starting materials of Formula II is a known compound and can be obtained by the hydrolysis of the antibiotic Cephalosporin C [Biochemical Journal, 79, 408–416 (1961)].

When using a substituted thiocarboxylic acid, the reaction is preferably carried out in the presence of a condensing agent such as dicyclohexylcarbodiimide, N-cyclohexyl-N'-morpholinoethylcarbodiimide, pentamethyleneketene-N-cyclohexylimine, N-ethyl-o-phenyl-isoxazolium-3'-sulphonate or phosphorus trichloride, etc. Under such circumstances, it is believed that the reaction may mainly proceed through an active form of the carboxyl radical in the substituted thiocarboxylic acid or of the amino radical in the 7-aminocephalosporanic acid.

Examples of the reactive derivatives of the substituted thiocarboxylic acid to be frequently used are the acid halide, acid azide, mixed acid anhydride with alkylphosphoric acid or alkylcarbonic acid, acid amide with imidazole or 4-substituted imidazole, acid cyanomethyl ester, acid p-nitrophenyl ester and so forth. These reactive derivatives are suitably selected in accordance with the kinds of the substituted thiocarboxylic acid to be used.

The reaction is usually carried out in the presence of a solvent. As a suitable solvent may be mentioned acetone, dioxane, acetonitrile, chloroform, ethylene chloride, tetrahydrofuran, or other organic solvents which are inert in the reaction and are used commonly. Of these solvents, the hydrophylic ones may be used with water.

Also, the reaction may be carried out in the presence of a base such as an alkali metal hydrogen carbonate, trialkylamine, pyridine, etc. The reaction is carried out in most cases under cooling or at room temperature though the temperature is not particularly limited.

After completion of the reaction, the reaction product is separated according to conventional methods known in the art.

When using the compound of Formula II wherein M is a pharmaceutically acceptable non-toxic cation as a starting compound, the object compound of Formula I wherein M is hydrogen is mainly obtained, because dissociation of the cation tends to occur during the separation of the reaction product. Therefore, if it is desired to obtain the object compound of Formula I wherein M is a pharmaceutically acceptable non-toxic cation, the compound of Formula I wherein M is hydrogen is treated with an appropriate compound such as sodium hydroxide, potassium hydroxide, sodium α-ethylhexanoate, triethylamine, dicyclohexylamine, diphenylenediamine or dibenzylethylenediamine.

In addition, the compound of Formula I wherein $R_2$ is pyridinium may be obtained by reacting the compound of Formula I wherein $R_2$ is acetoxy, with pyridine.

Both 7-aminocephalosporanic acid or a derivative thereof of Formula II to be used in the reaction of this invention and the product compound of Formula I are comparatively unstable and tend to decompose during the reaction. Therefore, it is preferable to carry out the reaction and separation under mild conditions.

The resulting compound of Formula I not only demonstrates resistance to penicillinase and an acid, but exhibits advantageous physiological properties and activity against a wide variety of micro-organisms.

The following examples will illustrate the compounds available in accordance with this invention.

In the examples, "MIC" means a minimum inhibitory concentration which is measured by the serial dilution method commonly employed in bioassay of antimicrobial compounds, and *Escherichia coli* and *Staphylococcus aureus* are referred to as "*E. coli*" and "*St. aureus,*" respectively.

EXAMPLE 1

(i) *7-[2-acetamididothiazole-5-(2-thioacetamido)] cephalosporanic acid*

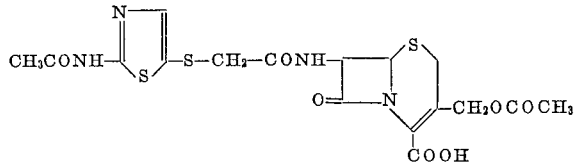

To 685 mg. of 7-aminocephalosporanic acid in 1.4 cc. of triethylamine and 25 cc. of chloroform were added 590 mg. of 2-acetamidothiazole-5-(2-thioacetic acid) and 320 mg. of dicyclohexyl-carbodiimide and allowed to stand for two days at room temperature. The reaction mixture was condensed under reduced pressure. The remainder was adjusted to pH 2.2 with hydrochloric acid and extracted with ethyl acetate. From the extract solution, ethyl acetate was distilled off under reduced pressure to obtain 115 mg. of 7-[2-acetamidothiazole-5-(2-thioacetamido)] cephalosporanic acid as powders having M.P. 150° C. (dec.).

UV: $\lambda_{max.}^{80\% \ C_2H_5OH \cdot NaOH}$ 305 mμ, E 211.

MIC: *E. coli* >40 γ/cc., *St. aureus* 2.0 γ/cc.

(ii) *7-[2-acetamidothiazole-5-(2-thioacetamido)]-3-pyridiniummethyl-decephalosporanic acid inner salt*

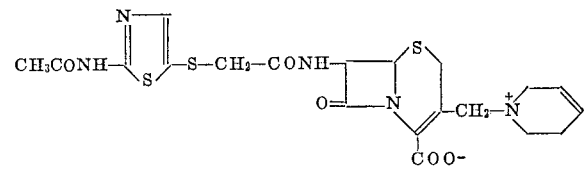

The substance (80 mg.) obtained in (i) dissolved in 1 cc. of water and 0.5 cc. of pyridine was allowed to stand overnight and condensed under reduced pressure. The remainder was dried and thoroughly washed with acetone. The resulting precipitate dissolved in water was filtered and condensed under reduced pressure. The remainder (30 mg.), washed with acetone and dried, was added to 3 cc. of an anion exchange resin [Dowex 1 x 8 (acetate type)], and filtered. The filtrate was condensed under reduced pressure to obtain 8 mg. of 7-[2-acetamidothiazole-5-(2-thioacetamido)] cephalosporanic acid as powders having M.P. 95–100° C. (dec.).

UV: $\lambda_{max.}^{H_2O}$ 264 mμ, E 179, $\lambda_{inf.}^{H_2O}$ 276 mμ, E 174.

MIC: *E. coli* >40 γ/cc., *St. aureus* 2 γ/cc.

EXAMPLE 2

*7-[2-phenyl-1,3,4-thiadiazole-5-(2-thioacetamido)] celphalosporanic acid*

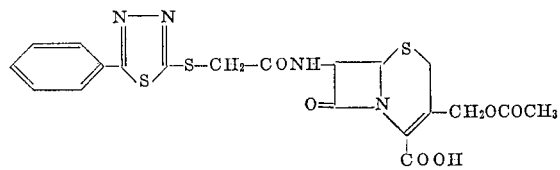

2-phenyl-1,3,4-thiadiazole-5-(2-thioacetic acid) (227 mg.) was dissolved in 10 cc. of tetrahydrofuran and 1 cc. of tetrahydrofuran solution containing 200 mg. of dicyclohexylcarbodiimide and stirred for 15 minutes at room temperature. To this solution was added dropwise 250 mg. of 7-aminocephalosporanic acid in 0.3 cc. of triethylamine and 6 cc. of chloroform within a minute, and allowed to stand overnight after stirring for five hours and a half. The reaction mixture was filtered and then tetrahydrofuran was distilled off under reduced pressure. To thus obtained remainder, water was added. The solution was adjusted to pH 3.0 with 5% hydrochloric acid and extracted with 100 cc. of ethyl acetate after removal of the oily decomposed product of dicyclohexylcarbodiimide. From the extract, ethyl acetate was distilled off under reduced pressure and the remainder was dissolved into acetone and filtered. Acetone was then distilled off from the filtrate and the remainder was washed with petroleum ether to obtain 29 mg. of 7-[2-phenyl-1,3,4-thiadiazole-5-(2-thioacetamido)] cephalosporanic acid as powders having M.P. 120–123° C. (dec.).

UV: $\lambda_{max.}^{80\% \ C_2H_5OH \cdot NaOH}$ 300 mμ, E 224.

MIC: *E. coli* >40 γ/cc., *St. aureus* 2 γ/cc.

EXAMPLE 3

*7-[2-(4-pyridyl)-1,3,4-thiadiazole-5-(2-thioacetamido] cephalosporanic acid*

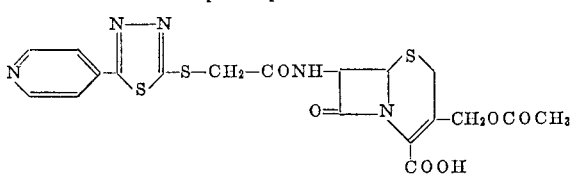

To 560 mg. of 7-aminocephalosporanic acid in 20 cc. of chloroform and 0.8 cc. of triethylamine were added 510 mg. of 2-(4-pyridyl)-1,3,4-thiadiazole-5-(2-thioacetic acid) and 320 mg. of dicyclohexylcarbodiimide in 7 cc. of acetone. The solution was stirred for 20 minutes at 40° C. and then 2 hours under ice-cooling, and allowed to stand overnight at room temperature. The reaction mixture was condensed to half in its volume under reduced pressure and extracted with ethyl acetate after adding sodium hydrogen carbonate. The water layer was adjusted to pH 2.8 to obtain a precipitate. The precipitate obtained was washed with ethyl acetate and extracted with acetone, and then acetone was distilled off under reduced pressure from the extract. The remainder was washed with ether to obtain 185 mg. of 2-[2-(4-pyridyl)-

1,3,4-thiadiazole-5-(2 - thioacetamido)] cephalosporanic acid as powders having M.P. 165° C. (dec.).

UV: $\gamma_{max.}^{80\% \ C_2H_5OH \cdot NaOH}$ 316 m$\mu$, E 172.

MIC: *E. coli* >40 $\gamma$/cc., *St. aureus* 20 $\gamma$/cc.

EXAMPLE 4

*7-[2-methyl-1,3,4-oxadiazole-5-(2-thioacetamido)] cephalosporanic acid*

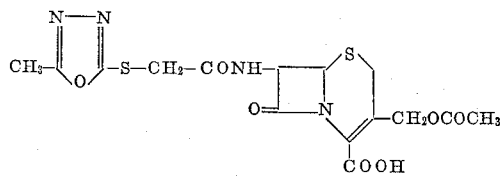

To 436 mg. of 2-methyl-1,3,4-oxadiazole-5-(2-thioacetic acid) in 10 cc. of chloroform was added 2.4 cc. of tetrahydrofuran solution containing dicyclohexylcarbodiimide (2.15 g./10 cc.). This solution was further added drop by drop with 680 mg. of 7-aminocephalosporanic acid in 20 cc. of chloroform and 0.8 cc. of triethylamine at room temperature. This mixture was stirred for 3 hours and allowed to stand overnight. After allowing to stand, tetrahydrofuran and chloroform was distilled off under reduced pressure. An oily substance obtained was filtered off after alkalifying with sodium hydrogen carbonate. The filtrate was adjusted to pH 1.0 with 5% hydrochloric acid and extracted with ethyl acetate. From the extract, ethyl acetate was distilled off under reduced pressure, and the remainder was washed with ether to obtain 13 mg. of 7-[2-methyl-1,3,4 - oxadiazole - 5-(2-thioacetamido)] cephalosporanic acid as powders having M.P. 80–86° C. (dec.).

MIC: *E. coli* 20 $\gamma$/cc., *St. aureus* 1 $\gamma$/cc.

EXAMPLE 5

*7-[2-phenyl-1,3,4-oxadiazole-5-(2-thioacetamido)] cephalosporanic acid*

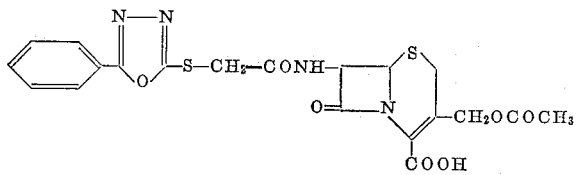

To 550 mg. of 7-aminocephalosporanic acid in 15 cc. of chloroform and 0.8 cc. of triethylamine was added 5 cc. of chloroform solution of 480 mg. of 2-phenyl-1,3,4-oxadiazole-5-(2-thioacetic acid) and 220 mg. of dicyclohexylcarbodiimide and allowed to stand at room temperature. The reaction mixture was filtered and the filtrate was condensed under reduced pressure. The remainder was washed with acetone to obtain 119 mg. of 7-[2-phenyl-1,3,4-oxadiazole-5-(5-thioacetamido)] cephalosporanic acid as crystals having M.P. 117–122° C.

UV: $\lambda_{max.}^{80\% \ C_2H_5OH \cdot NaOH}$ 272 m$\mu$, E 439.

MIC: *E. coli* 20 $\gamma$/cc., *St. aureus* 0.4 $\gamma$/cc.

EXAMPLE 6

*7-[2-phenyl-1,3,4-oxadiazole-5-(3-thiopropionamido)] cephalosporanic acid*

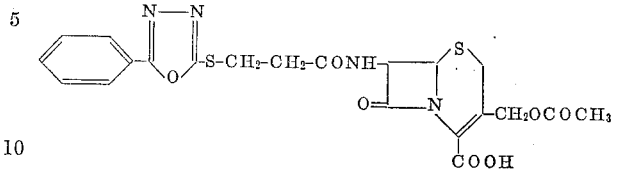

To 500 mg. of 2-phenyl-1,3,4-oxadiazole-5-(3-thiopropionic acid) and 430 mg. of dicyclohexylcarbodiimide in 20 cc. of chloroform was added 540 mg. of 7-aminocephalosporanic acid in 0.5 cc. of triethylamine and 15 cc. of chloroform. The solution was stirred for 5 hours at room temperature and allowed to stand overnight. After allowing to stand, the reaction mixture was filtered and the filtrate was condensed under reduced pressure. The remainder, after adding water, was adjusted to pH 1.0 with 5% hydrochloric acid and extracted with ethyl acetate. This extract solution was condensed under reduced pressure and washed with ether to obtain 91 mg. of 7-[2-phenyl-1,3,4-oxadiazole-5-(3-thiopropionamido)] cephalosporanic acid as powders having M.P. 89–97° C. (dec.).

UV: $\lambda_{max.}^{80\% \ C_2H_5OH \cdot NaOH}$ 286 m$\mu$, E 257.

MIC: *E. coli* >40 $\gamma$/cc., *St. aureus* 0.5 $\gamma$/cc.

EXAMPLE 7

(i) *7-[2-(4-nitrophenyl)-1,3,4-oxadiazole-5-(2-thioacetamido)] cephalosporanic acid*

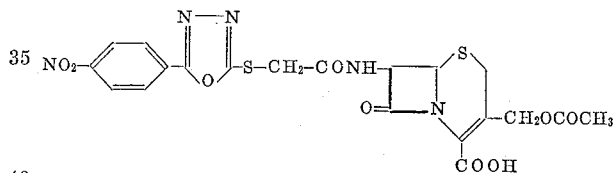

2-(4-nitrophenyl)-1,3,4-oxadiazole-5-(2-thioacetic acid) (603 mg.) was dissolved in 30 cc. of chloroform and 2 cc. of tetrahydrofuran solution (215 mg./cc.) and stirred for 30 minutes at room temperature. To this solution was added dropwise 680 mg. of 7-aminocephalosporanic acid in 0.7 cc. of triethylamine and 15 cc. of chloroform. This obtained solution was stirred for 4.5 hours at room temperature and then allowed to stand overnight. The reaction mixture was filtered and then chloroform was distilled off from the filtrate under reduced pressure. The remainder was filtered after adding water, and the filtrate was adjusted to pH 2.0 with hydrochloric acid and extracted with ethyl acetate. The extract solution was condensed under reduced pressure, and the remainder was dissolved in acetone. This acetone solution was also condensed under reduced pressure, and the resultant remainder was washed with ether to obtain 144 mg. of 7-[2-(4-nitrophenyl)-1,3,4-oxadiazole-5-(2-thioacetamido)] cephalosporanic acid as powders M.P. 145–152° C. (dec.).

UV: $\lambda_{max.}^{80\% \ C_2H_5OH \cdot NaOH}$ 261.5 m$\mu$, E 369.

MIC: *E. coli* 40 $\gamma$/cc., *St. aureus* 1 $\gamma$/cc.

(ii) *Dicyclohexylamine salt of 7-[2-(4-nitrophenyl)-1,3,4-oxadiazole-5-(2-thioacetamido)] cephalosporanic acid*

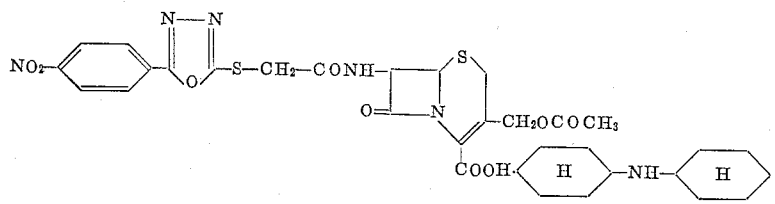

The substance (90 mg.) obtained in (i) was dissolved in 4 cc. of acetone. To this acetone solution was added 30.5 cc. of dicyclohexylamine and allowed to stand in an ice-box to obtain 38 mg. of dicyclohexylamine salt of 7 - [2 - (4 - nitrophenyl)-1,3,4-oxadiazole-5-(2-thioacetamido)] cephalosporanic acid as crystals having M.P. 170–177° C. (dec.).

UV: $\lambda_{max.}^{95\% \ C_2H_5OH}$ 310 m$\mu$, E 210, $\lambda_{max.}^{95\% \ C_2H_5OH}$ 228 m$\mu$, E 234.

EXAMPLE 8

(i) *7-[2-(3-chlorophenyl)-1,3,4-oxadiazole-5-(2-thioacetamido) cephalosporanic acid*

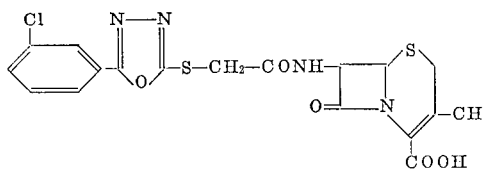

2-(3-chlorophenyl)-1,3,4-oxadiazole - 5 - (2 - thioacetic acid) (813 mg.) was dissolved in 15 cc. of chloroform and 3 cc. of tetrahydrofuran, to which solution was added 4 cc. of tetrahydrofuran solution of dicyclohexylcarbodiimide (211 mg./cc.) and stirred for 5 minutes at room temperature. To this solution was further added 820 mg. of 7-aminocephalosporanic acid in 0.8 cc. of triethylamine and 15 cc. of chloroform and stirred for 5 hours at room temperature. After allowing to stand overnight in an icebox, the reaction mixture was filtered, and the filtrate was condensed under reduced pressure. The remainder was added with 10 cc. of water and filtered. The filtrate was adjusted to pH 2.0 with hydrochloric acid and extracted with ethyl acetate. The extract solution was condensed under reduced pressure, and the remainder was washed with petroleum ether to obtain 193 mg. of 7-[2-(3-chlorophenyl)-1,3,4-oxadiazole-5-(2-thioacetamido)] cephalosporanic acid as powders having M.P. 86–93° C. (dec.).

UV: $\lambda_{max.}^{tetrahydrofuran}$ 277 m$\mu$, E 415.6

MIC: *E. coli* 20 $\gamma$/cc., *St. aureus* 0.5 $\gamma$/cc.

(ii) *Sodium salt of 7-[2-(3-chlorophenyl)-1,3,4-oxadiazole-5-(2-thioacetamido)] cephalosporanic acid*

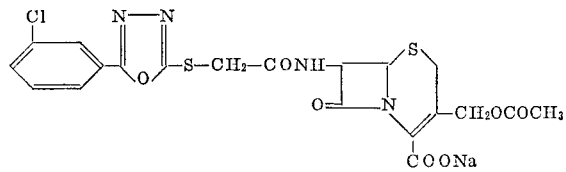

To 37 mg. of the substance obtained in (i) dissolved in 3 cc. of acetone, was added 0.1 cc. of an acetone solution of sodium $\alpha$-ethylhexanoate (116 mg./cc.). This solution was allowed to stand in an ice-box, and the resulting precipitate was recrystallized from ethanol to obtain sodium salt of 7-[2-(3-chlorophenyl)-1,3,4-oxadiazole-5-(2-thioacetamido)] cephalosporanic acid having M.P. 194–196° C. (dec.).

UV: $\lambda_{max.}^{H_2O}$ 269 m$\mu$, E 368, $\lambda_{inf.}^{H_2O}$ 299 m$\mu$, E 100.

MIC: *E. coli* >40 $\gamma$/cc., *St. aureus* 1 $\gamma$/cc.

We claim:
1. A compound of the formula,

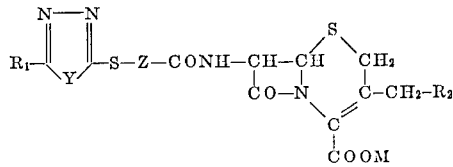

in which $R_1$ is lower alkyl, lower alkanoylamino, pyridyl, phenyl or phenyl having nitro or halogen; $R_2$ is acetoxy or pyridinium; Y is oxygen or sulfur; Z is —CH$_2$— or —CH$_2$—CH$_2$—; and M is hydrogen, an alkali metal, dicyclohexylammonium or an anionic charge.

2. 7-[2-phenyl-1,3,4-thiadiazole-5-(2 - thioacetamido)] cephalosporanic acid.

3. 7-[2-(4-pyridyl)-1,3,4-thiadiazole - 5 - (2-thioacetamido)] cephalosporanic acid.

4. 7-[2-methyl-1,3,4-oxadiazole-5-(2 - thioacetamido)] cephalosporanic acid.

5. 7-[2-phenyl-1,3,4-oxadiazole-5-(2 - thioacetamido)] cephalosporanic acid.

6. 7-[2-phenyl-1,3,4-oxadiazole - 5 - (3-thiopropionamido)] cephalosporanic acid.

7. 7-[2-(4-nitrophenyl)-1,3,4-oxadiazole - 5 - (2-thioacetamido)] cephalosporanic acid.

8. 7-[2-(3-chlorophenyl)-1,3,4-oxadiazole - 5 - (2-thioacetamido)] cephalosporanic acid.

9. Sodium salt of 7-[2-(3-chlorophenyl)-1,3,4-oxadiazole-5-(2-thioacetamido)] cephalosporanic acid.

10. Dicyclohexylamine salt of 7-[2-(4-nitrophenyl)-1,3,4-oxadiazole-5-(2 - thioacetamido)] cephalosporanic acid.

References Cited
UNITED STATES PATENTS 3,218,318  11/1965  Flynn _____ 260—243
3,261,832  7/1966  Cowley et al. _____ 260—243

NICHOLAS S. RIZZO, *Primary Examiner.*